US009878297B2

(12) United States Patent
Shulenberger et al.

(10) Patent No.: US 9,878,297 B2
(45) Date of Patent: Jan. 30, 2018

(54) APPARATUS FOR PROCESSING A BIOMASS

(71) Applicant: Renewable Fuel Technologies, Inc., San Mateo, CA (US)

(72) Inventors: Arthur M. Shulenberger, Incline Village, NV (US); Mark Wechsler, San Mateo, CA (US)

(73) Assignee: Renewable Fuel Technologies, Inc., San Mateo, CA (US)

( * ) Notice: Subject to any disclaimer, the term of this patent is extended or adjusted under 35 U.S.C. 154(b) by 320 days.

(21) Appl. No.: 14/150,634

(22) Filed: Jan. 8, 2014

(65) Prior Publication Data
US 2014/0119997 A1 May 1, 2014

Related U.S. Application Data

(62) Division of application No. 12/576,157, filed on Oct. 8, 2009, now Pat. No. 9,301,982.
(Continued)

(51) Int. Cl.
*B01J 6/00* (2006.01)
*C10B 47/44* (2006.01)
(Continued)

(52) U.S. Cl.
CPC ............ *B01J 6/008* (2013.01); *C10B 47/44* (2013.01); *C10B 53/02* (2013.01); *C10G 2/30* (2013.01); *C10J 3/007* (2013.01); *C10J 3/66* (2013.01); *C10L 1/02* (2013.01); *C10L 5/363* (2013.01); *C10L 5/44* (2013.01); *C10L 9/083* (2013.01); *C10J 2300/0909* (2013.01); *C10J 2300/1861* (2013.01); *Y02E 50/10* (2013.01);
(Continued)

(58) Field of Classification Search
CPC ... C10G 2/30; C10G 2/32; C10G 3/10; C10G 2300/101; Y02E 50/14
USPC ................................ 585/242, 240; 48/127.1
See application file for complete search history.

(56) References Cited

U.S. PATENT DOCUMENTS 4,553,978 A 11/1985 Yvan
4,787,917 A 11/1988 Leclerc de Bussy
(Continued)

FOREIGN PATENT DOCUMENTS

| JP | 10-251671 A | 9/1998 |
|---|---|---|
| KR | 10-0590973 B1 | 6/2006 |
| WO | WO 2009/151367 A1 | 12/2009 |

OTHER PUBLICATIONS

International Search Report and Written Opinion PCT/US2009/0060632, dated May 31, 2010.
(Continued)

Primary Examiner — Nina Bhat
(74) Attorney, Agent, or Firm — Kilpatrick Townsend & Stockton LLP

(57) ABSTRACT

An apparatus to convert carbonaceous materials, particularly biomass and those biomass resources which are remotely located, into a solid material, which may be a high performance solid fuel, are presented. The apparatus provides a continuous process which can be completely powered by the energy contained in the biomass. The heat, mechanical power and electrical power are provided from the energy in the biomass, through the methods described. In this way, the apparatus is free to operate in remote locations, where no power or auxiliary fuel sources are available.

17 Claims, 7 Drawing Sheets

Related U.S. Application Data

(60) Provisional application No. 61/248,660, filed on Oct. 5, 2009, provisional application No. 61/105,801, filed on Oct. 15, 2008.

(51) Int. Cl.

| | | |
|---|---|---|
| *C10B 53/02* | (2006.01) | |
| *C10G 2/00* | (2006.01) | |
| *C10J 3/00* | (2006.01) | |
| *C10J 3/66* | (2006.01) | |
| *C10L 1/02* | (2006.01) | |
| *C10L 5/36* | (2006.01) | |
| *C10L 5/44* | (2006.01) | |
| *C10L 9/08* | (2006.01) | |

(52) U.S. Cl.
CPC ............... *Y02E 50/14* (2013.01); *Y02E 50/15* (2013.01); *Y02E 50/30* (2013.01); *Y02E 50/32* (2013.01)

(56) References Cited

U.S. PATENT DOCUMENTS

| | | | |
|---|---|---|---|
| 5,057,189 A | 10/1991 | Apffel | |
| 5,075,022 A | 12/1991 | Gambell et al. | |
| 6,991,769 B2 | 1/2006 | Kaneko et al. | |
| 7,578,927 B2 | 8/2009 | Marker et al. | |
| 7,816,570 B2* | 10/2010 | Roberts, IV | C10G 45/58 |
| | | | 585/14 |
| 7,893,307 B2* | 2/2011 | Smith | C10B 7/10 |
| | | | 201/2.5 |
| 7,942,942 B2 | 5/2011 | Paoluccio | |
| 8,063,258 B2 | 11/2011 | Bartek et al. | |
| 8,105,400 B2 | 1/2012 | Bergman | |
| 8,217,212 B2* | 7/2012 | Paoluccio | C10B 49/14 |
| | | | 201/21 |
| 8,669,404 B2 | 3/2014 | Shulenberger et al. | |
| 8,858,900 B2* | 10/2014 | Galloway | C10G 2/30 |
| | | | 422/233 |
| 9,005,400 B2 | 4/2015 | Wechsler et al. | |
| 9,068,121 B1 | 6/2015 | Tharpe, Jr. et al. | |
| 2007/0094929 A1 | 5/2007 | Kang et al. | |
| 2008/0022595 A1* | 1/2008 | Lemaire | C10J 3/50 |
| | | | 48/209 |
| 2008/0229653 A1 | 9/2008 | Iversen et al. | |
| 2009/0031615 A1* | 2/2009 | Joshi | C10G 2/32 |
| | | | 44/307 |
| 2009/0077892 A1 | 3/2009 | Shulenberger et al. | |
| 2009/0193679 A1* | 8/2009 | Guyomarc'h | C01B 53/02 |
| | | | 34/467 |

OTHER PUBLICATIONS

International Preliminary Report on Patentability PCT/US2009/0060632, dated Apr. 28, 2011.
International Search Report and Written Opinion PCT/US2011/027449, dated Dec. 7, 2011.
International Preliminary Report on Patentability PCT/US2011/027449, dated Sep. 11, 2012.
Wechsler et al., co-pending U.S. Appl. No. 13/042,356 filed Oct. Mar. 7, 2011.
Wechsler et al., co-pending U.S. Appl. No. 14/151668, filed Jan. 9, 2014.
Extended European Search Report of Corresponding European Application No. 11753883.5, dated Apr. 9, 2014, Arthur M. Shulenberger et al.
Second Extended European Search Report of Corresponding European Application No. 11753883.5, dated Apr. 2, 2015, Arthur M. Shulenberger et al.
Dow Chemical Company, "Dowtherm A Heat Transfer Fluid", Mar. 1, 1997, pp. 1-30, XP055074069, Retrieved from the Internet: URL:http://msdssearch.dow.com/PublishedliteratureDOWCOM/dh_0030/0901b803800303cd.pdf?filepath=/heattrans/pdfs/noreg/176-01337. pdf &from Page=GetDoc.[retrieved on Aug. 5, 2013].
U.S. Appl. No. 14/151,668, "Non-Final Office Action", dated Mar. 18, 2016, 8 pages.
U.S. Appl. No. 14/151,668, "Notice of Allowance", dated Aug. 23, 2017, 8 pages.

* cited by examiner

APPARATUS FOR PROCESSING A BIOMASS

CROSS-REFERENCE TO RELATED APPLICATIONS

This application claims the benefit of U.S. Provisional Application No. 61/105,801, filed Oct. 15, 2008, and U.S. Provisional Application No. 61/248,660, filed Oct. 5, 2009. The entire contents of the above-listed provisional applications are hereby incorporated by reference herein and made part of this specification.

BACKGROUND OF THE INVENTION

Field of the Invention

The present invention generally relates to the processing of biomass, and more particularly to a self-contained method and system for generating solids from biomass.

Discussion of the Background

The use of solid fuels is the world's largest energy market. In the United States, solid fuels are used primarily for generating electric power and in metallurgic and cement manufacturing processes. This market is dominated by non-renewable resources, principally coal, and to a lesser extent petroleum coke. Biomass sources, which are generally considered to be renewable, form less than 5% of the U.S. Market.

There is an urgency to switch to energy sources that will have less of an environmental impact, especially with regards to the emission of greenhouse gases. Biomass sources are an attractive alternative to conventional solid fuels, but high transportation costs and low energy density of the biomass materials have hindered their widespread use.

Prior art techniques that have been used improve the fuel value and physical properties of biomass range include, for example, drying the biomass to remove moisture contained therein without chemically altering the biomass, and producing charcoal from the biomass, where the biomass is chemically altered into fixed carbon. Drying is accomplished at temperatures below 120 C, while charcoal production requires temperatures above 500 C. Both drying and producing charcoal are incomplete solutions, and do not enable the access to remote biomass resources. Dry biomass has low energy volumetric density, and its transportability is not improved over wet biomass. The energy per truckload, and hence the transportation cost, does not improve significantly when compared to wet biomass. Producing charcoal is inefficient, with only 20% to 30% of the energy in the original biomass preserved in the charcoal. So much energy is lost that producing charcoal for fuel is discouraged except for use in metallurgical processes, where it is mandatory and thus unavoidable.

Drying the biomass combined with grinding and pelletizing the resultant fuel produces a fuel with energy density of between 7,000 and 8,000 Btu per pound, and a density of 0.6-1 $g/cm^3$, and is something of an improvement. However the pellets are intolerant to water, are capable of spontaneous combustion, and are thus difficult to store. In addition, densifying charcoal requires a binder, a severe limitation when operating remotely. In either case, the resultant fuel is unsatisfactory for widespread application to industrial combustion processes.

Thus there is a need in the art for a method and apparatus that permits for the widespread use of biomass as a solid fuel. Such a method and apparatus should be inexpensive to implement and should produce a fuel that is compatible with apparatus that use conventional solid fuels.

BRIEF SUMMARY OF THE INVENTION

Certain embodiments described herein overcome the disadvantages of the prior art by torrefaction (driving off of volatile ingredients) and pelletization of the resultant biomass. The biofuel thus produced may have an energy density superior to lower grade fossil coals, and physical properties (density, grindability, water tolerance) compatible with industry needs.

Certain other embodiments described herein overcome the disadvantages of the prior art by utilize the energy content in gasses driven off during torrefaction to operate the biomass-to-biofuel process, resulting in a self contained fuel production facility, requiring only biomass for steady state operation. Specifically, torrefaction typically produces low energy value gas products, i. e. ascetic acid and methanol, which contain energy which has been lost to the solids. Certain embodiments recover the thermal energy in the gas and/or convert the gas to mechanical and/or electrical energy in a heat engine or fuel cell.

Embodiments presented herein overcome the disadvantages of prior art by remotely converting biomass to a biofuel. For example, one embodiment is an apparatus that may be place near a source of biomass and processes the biomass into a biofuel, which is then transported to market. Such apparatus has several advantages. First, the biomass can be converted to a biofuel that is more generally usable than the raw biomass. Second, biofuels have a higher energy density than biomass, thus reducing the transportation cost per energy stored within the fuel. Third, previously uneconomic biomass resources, particularly remote resources, can be economically brought to market.

Certain embodiments provide a method for converting a biomass into a biofuel within an apparatus. The method includes heating the biomass to produce a gas and the biofuel, reforming at least a portion of the gas to form a fuel, recovering thermal energy from the reforming, and providing at least a portion of the recovered thermal energy for the heating.

Certain other embodiments provide a method of processing biomass to form a biofuel in an apparatus. The method includes heating the biomass to produce torrefied biomass and torrefaction gases evolved from torrefaction of the biomass, and gasification of the biomass to produce gasified biomass. The amount of torrefaction gases and the amount of gasified biomass are adjusted to vary characteristics of the biofuel.

Certain embodiments provide an apparatus for converting a biomass into a biofuel. The apparatus includes a reactor, a reformer, and a heat exchanger. The reformer includes a first portion and a second portion. The first portion is for transporting and thermally treating biomass and the second portion is for transporting a heat transfer medium. At least part of the second portion is in thermal contact with at least part of the second portion. The first portion includes an inlet to accept the biomass, a first outlet to provide treated biomass, and a second outlet to provide gases evolved from the biomass at the second outlet. The second portion includes an inlet to accept a heat transfer medium and an outlet to provide the heat transfer medium. The reformer has an inlet in fluid communication with the second outlet of the first portion, and an outlet, where the reformer is adapted to chemically react gas accepted at the inlet and provide a fuel at the outlet. The heat exchanger is adapted to provide thermal contact between the heat transfer medium and the fuel, where the heat exchanger has an inlet in fluid communication with the second portion outlet, an outlet in fluid communication with the second portion inlet, a fuel inlet in fluid communication with the reformer outlet, and a fuel outlet to provide fuel. In the embodiment, when the apparatus is provided with biomass, the reactor thermally treats the biomass to form the biofuel and the heat exchanger recovers thermal energy for the reactor.

In certain embodiments the apparatus and method includes the steps of drying the biomass, torrefying the biomass, and pelletizing the resulting biofuel. In another embodiment, the gases resulting from torrefaction of the biomass have a significant energy content, which is utilized in operating the process. In yet another embodiment, the apparatus and method are self-contained—the input of energy when starting up the process can be provided from the biomass itself.

In certain embodiments, the apparatus and method converts carbonaceous materials, such as biomass which may be remotely located, into a high performance solid fuel for use in industrial combustion processes. The apparatus and method may provide a continuous process which can be completely powered by the energy contained in the biomass. Thus the heat, mechanical power and electrical power may be provided from the energy in the biomass. The apparatus is thus free to operate in remote locations, where no power or auxiliary fuel sources are available. In certain embodiments, utility services may be available and may be utilized to simplify the apparatus.

In certain other embodiments, the apparatus and method converts biomass into a biofuel and a gas having energy value. This gas may be converted into thermal, mechanical, and or electrical power for the process. In many embodiments, the gas generated has sufficient energy content to power the process. Thus only the energy contained in the biomass is utilized in the production of biofuel.

In certain embodiments, it is possible to operate only from the biomass and generate a biomass having between 70% and 90% of the energy of the biomass, on a dry basis.

In one embodiment, one or more reactors heat and/or cool the biomass operates using the phase change of a heat transfer medium. The phase change occurs on a surface of the reactor that is in thermal contact with the biomass.

In another embodiment, at least a portion of the steam that is used to dry a biomass is obtained by compressing steam from previously dried biomass—that is, drying causes steam to leave the biomass, is compressed to a higher temperature and pressure, and is provided for thermal contact with fresh, incoming biomass.

In yet another embodiment, gasses evolved from the torrefaction of biomass are used to provide heat for biomass processing and/or are used directly or after further processing to operate a heat engine or fuel cell to generate power of operating the process.

In one embodiment, heat generated in a heat engine is used to provide heat for a portion of the torrefaction of biomass. The fuel for operating the heat engine may be gas from previously torrefied biomass, from an external source, or from a separate biomass gasification unit.

In another embodiment, at least a portion of reformed or unreformed gases evolved during torrefaction are used to reform torrefaction gases to form a fuel.

In yet another embodiment, reformed torrefaction gases are cooled to remove water and increase the energy value of the gases.

These features together with the various ancillary provisions and features which will become apparent to those skilled in the art from the following detailed description, are attained by the apparatus and method of the present invention, preferred embodiments thereof being shown with reference to the accompanying drawings, by way of example only, wherein:

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
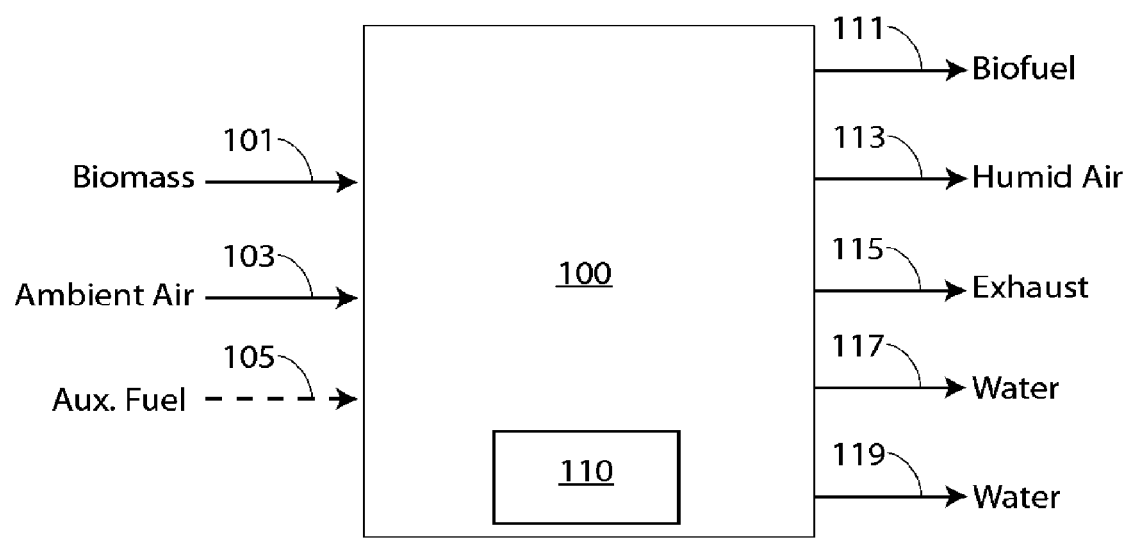
FIG. 1 is a general schematic of an apparatus for converting biomass to biofuel.

FIG. 1 is a general schematic of an apparatus 100 for converting biomass to biofuel. The term "biomass" is a general term that refers to living matter or formerly living matter. It may include, for example and without limitation, material specifically grown or gathered for conversion to biofuel, or waste products from the use or maintenance of plants. Examples of biomass include, but are not limited to, woody biomass, agricultural byproducts, and municipal green waste. A "biofuel" is a fuel composed of or produced from biological raw materials. One type of preferred biofuel is a solid that is compatible with existing power plants, allowing for the reduction or elimination of conventional hydrocarbon fuels. Other types of biofuels are gaseous, liquid, or some combination of gaseous, liquid, and/or solid biofuel. The term "torrefied biomass" as used herein refers to a biomass that is heated to a moderate temperature, such as above approximately 100 C and below approximately 500 C, for example and without limitation. The resultant torrefied biomass has volatile gases that are driven off are sometimes referred to herein as "torrefaction gases." In certain embodiments, the biomass is heated to a first temperature of approximately 100 C, driving off gases that are very volatile, including steam, and then is heated to a higher temperature, resulting in gases having a low steam contents.

It is a general feature that apparatus 100 converts a biomass to a biofuel efficiently, both from an energy and cost perspective. In certain embodiments apparatus 100 is a system that includes physical and/or chemical processes to accept a biomass at an input 101 and produce a biofuel at an output 111. Certain embodiments of apparatus 100 may also include the generation of electrical power which is generally, but not necessarily exclusively, used within the apparatus.

Apparatus 100 may further include other inputs that accept other materials that may be used in the conversion of biomass to biofuel and other outputs that are used to reject products that are not included in the biofuel. Thus for example, and without limitation, apparatus 100 may have an input 103 for accepting ambient air and an output 113 for rejecting humid air, an output 115 for rejecting gases that are either inappropriate for, or not easily included in, the biofuel, or that contain excess heat from the apparatus, an output 117 that rejects water, and an output 119 that rejects ash.

In certain other embodiments, an input 105 is provided for an auxiliary fuel. The auxiliary fuel, which may, for example be diesel fuel, methane, or some other liquid or gaseous fuel, is an optional input that may be used in the conversion of biomass to biofuel. The auxiliary fuel may thus be used to generate electric, thermal or mechanical energy. In certain embodiments, apparatus 100 operates as a self-sustained process, not requiring auxiliary fuel. In these embodiments, an auxiliary fuel may be used during the start-up of the process, either as needed energy to start the process or to allow components obtained therein to more quickly reach temperatures that allow for the efficient operation of the apparatus. In certain other embodiments, the auxiliary fuel may include, or be replaced by, an input of electrical power, or the fuel may be the biomass or a stored portion of the torrefied product, or gasified biomass.

In addition, apparatus 100 includes a control system 110, such as programmable computer, that collects information from sensors within the apparatus, which may include but are not limited to, contact or non-contact temperature sensors, pressure sensors, gas analyzers, humidity sensors, liquid level sensors, solid level sensors, and flow sensors and/or controllers. Control system 110 may also provides signals to operate and/or control valves, motors, pumps and the like within apparatus 100. Control system 110 may, for example and without limitation, control valves or flow rates to optimize the performance of apparatus 100 by, for example, ensuring that various components are operating at predetermined temperatures or pressure that allow catalysts, heat engines or heat exchanger to operate at certain conditions.

Figure 2:
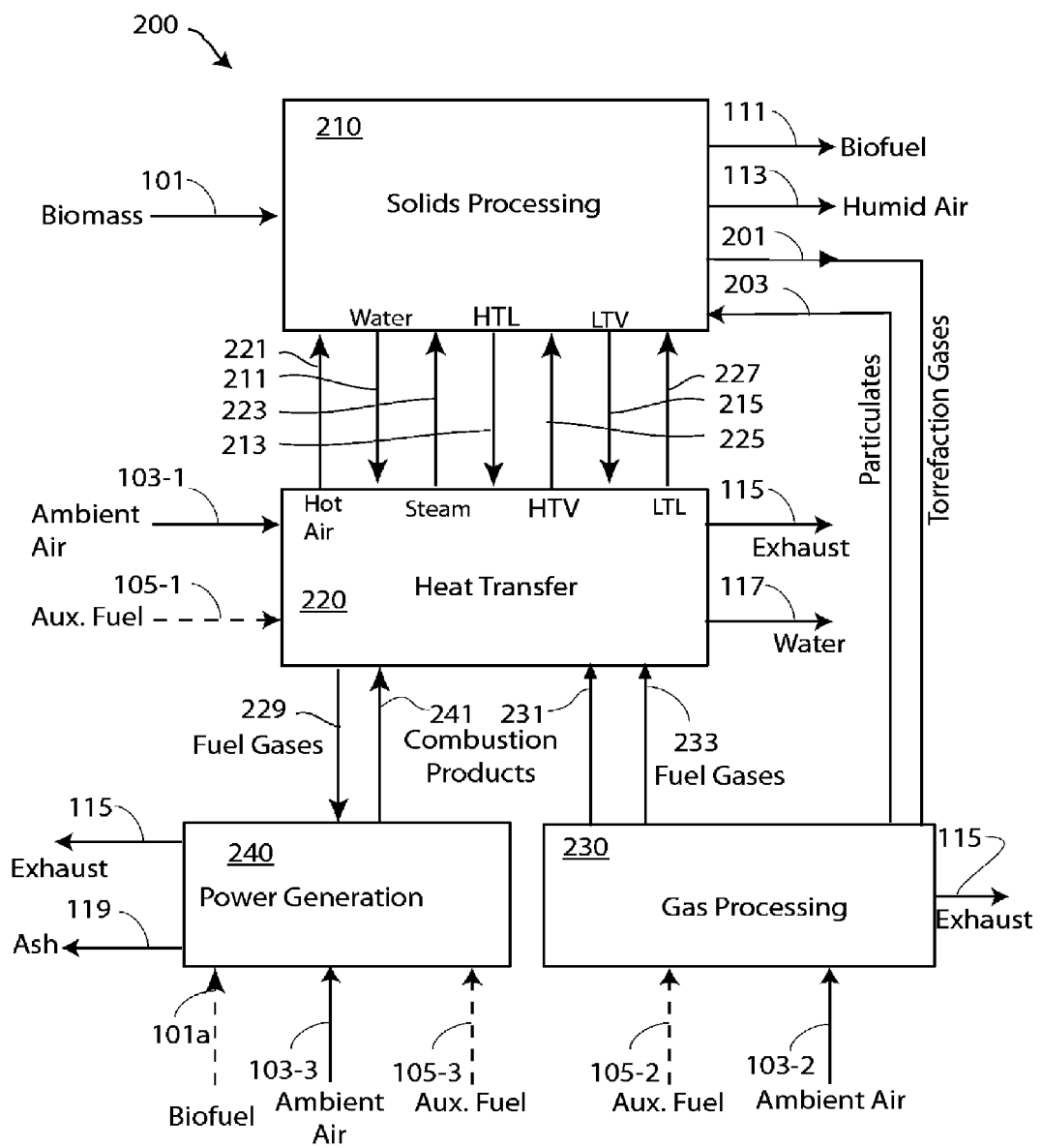
FIG. 2 is a first embodiment of a biomass-to-biofuel apparatus.

FIG. 2 is a first embodiment of a biomass-to-biofuel apparatus 200. Apparatus 200 may be generally similar to apparatus 100, except as further detailed below.

Apparatus 200 is shown, schematically, as including a solids processing module 210, a heat transfer module 220, a gas processing module 230, and a power generation module 240. The names given to modules 210, 220, 230, and 240 ("solids processing," "heat transfer," "gas processing," and "power generation") are not limiting—they are meant to aid in the discussion of apparatus 200 and are invocative of their general function. Thus for example and without limitation, while heat transfer module 220 includes several boilers, which may include heat exchangers, other modules may also include heat exchanges. Also, for example, while gas processing module 210 converts volatiles into gaseous fuels, some gas processing may also occur at the conditions of solids processing module 210.

As discussed subsequently in greater detail with respect to a specific embodiment, solids processing module 210 is generally configured to have a steady-state operating condition to a) accept biomass including, but not limited to, wood, plant residues, forest trimmings, or paper residue, b) dry the biomass; c) torrefy the biomass, and d) pelletize the torrefied biomass to form a biofuel. The gases evolved from torrified gases are processed in gas processing module 230 to form fuel gases which exchange heat in heat transfer module 220 and are utilized to generate electricity within power generation module 240. Heat transfer module 220 is integrated into apparatus 200 to efficiently utilize the fuel gases and any heat in the combustion products in solids processing module 210.

In one embodiment, solids processing module 210 accepts biomass at input 101, provides biofuel at output 111. Solids processing module 210 also rejects humid air at output 113.

Solids processing module 210 exchanges material with gas processing module 230. Thus, for example, gases (labeled "Torrefaction Gases") are provided from solids processing module 210 to gas processing module 230 via a line 201 and other material (labeled "Particulates") are accepted from the gas processing module via a line 203.

Solids processing module 210 also exchanges several working fluids with heat transfer module 220. The working fluids, which are heated or cooled in heat transfer module 220 may be used to thermally process the biomass in solids processing module 210. FIG. 2 illustrates that apparatus 100 may include a high, medium, and low temperature heat transfer fluid. In one embodiment, a high temperature fluid is transferred between module 210 and 220 as a high temperature heat transfer medium liquid (HTL) via a line 213 and a high temperature heat transfer medium vapor (HTV) via line 225; a medium temperature heat transfer medium is transferred as water via a line 211 and steam via a line 223; a low temperature heat transfer medium is transferred as a low temperature vapor (LTV) via a line 215, and a low temperature heat transfer medium liquid (LTL) via a line 227; and hot air is transferred via a line 221.

In addition to the heat transfer fluids discussed in the previous paragraph, heat transfer module 220 accepts ambient air at input 103-1 and an optional auxiliary fuel at input 105-1, and rejects exhaust gases at output 115 and water at output 117. Heat transfer module 220 also accepts fuel gases at a line 233 from gas processing module 230 and provides fuel gases at a line 229 to power generation module 240, and accepts combustion products at line 231 from gas processing module 230 and a line 241 from power generation module 240.

Gas processing module 230 also accepts ambient air at an input 103-2, rejects gases at exhaust line 115, and has an optional auxiliary fuel at input 105-2; provides gases to heat transfer module 220 including combustion gases via a line 223 and fuel gases via a line 231; and exchanges material with solids processing module 210, including accepting torrefaction gases via line 201 and providing particulates via line 203.

Power generation module 240 accepts ambient air at an input 103-2, rejects gases at exhaust line 115, has an optional auxiliary fuel at input 105-3, and exchanges material with heat transfer module 220 including providing exhaust gases via line 241 and accepting fuel gases via line 229. Power generation module 240 optionally accepts biomass via a line 101a that may be gasified for producing power.

Power generation module 240 produces electric power, which may be provided to more or more of the other modules 210, 220, or 230, or for the control of the entire Apparatus 200.

Figure 3:
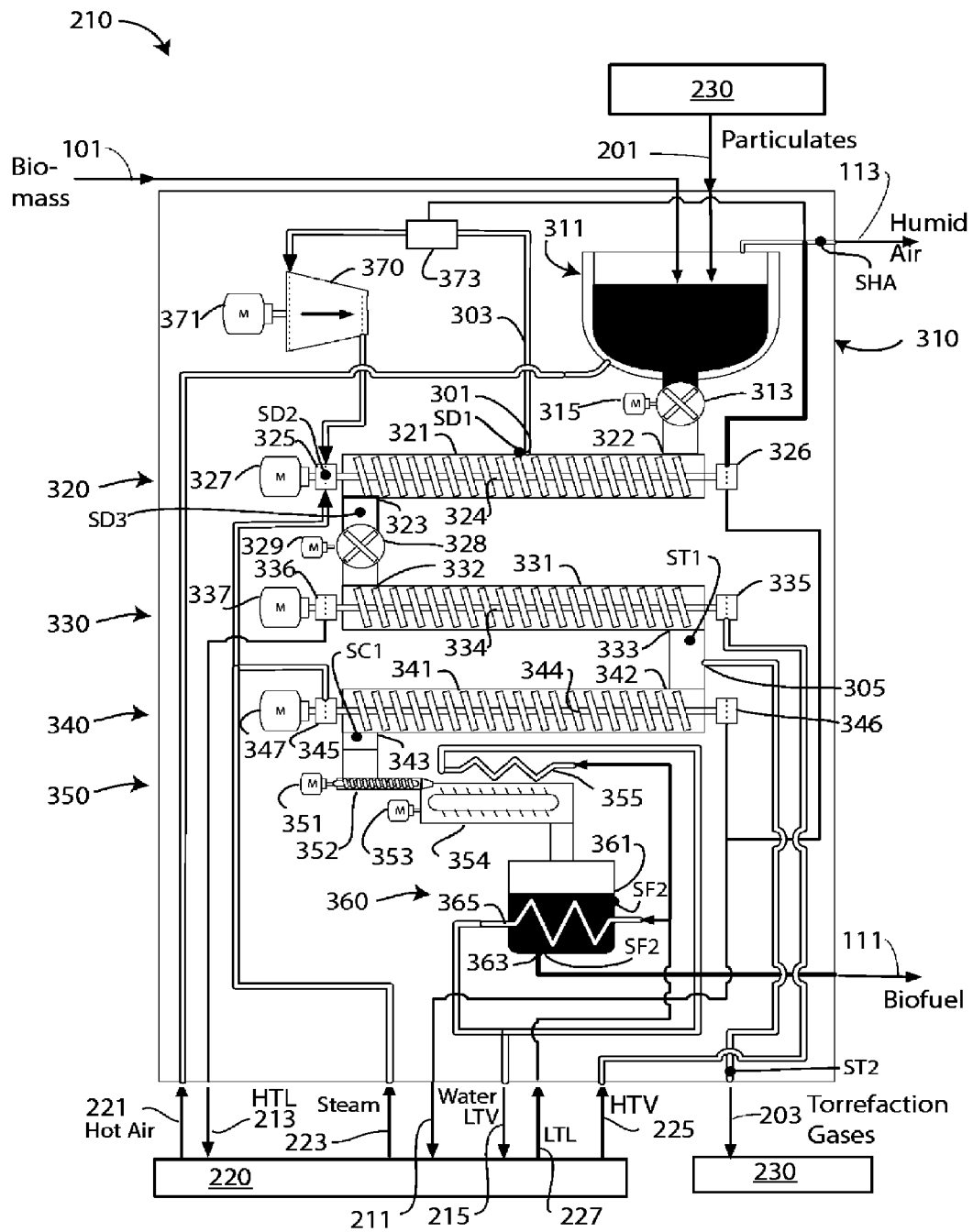
FIG. 3 is a schematic of a solid processing module of the embodiment of FIG. 2.

FIG. 3 is a schematic of one embodiment of solids processing module 210. Solids processing module 210 may be generally similar to the similarly labeled module of FIG. 2, except as further detailed below.

Module 210 includes an input unit 310, a dryer reactor 320, a torrefaction reactor 330, a cooling reactor 340, a pelletizer 350, an output hopper 360, and a compressor 370.

Input unit 310 includes a hopper 311 and an input metering load lock 313 powered by a motor 315. In one embodiment, load lock 313 provides for metering of material and can allow for a pressure differential across the load lock. Thus load lock 313 may be, for example and without limitation a star valve, and be operated using pressure sensors (not shown), which may be, without limitation, a Hastings HPM-2002-OBE (Teledyne Hastings Instruments, Hampton Va.).

Gases present in hopper 311 are collected and provided as humid air to line 113, which removes water from apparatus 100. Hopper 311 accepts biomass from input 101 and accepts solid material, such as particulates, from gas processing module 230 via a line 201.

FIG. 3 illustrates reactors 320, 330, and 340 schematically as augers, which have cylindrical inner cavities with a helical screw. Solid material may be pushed through the auger by rotating the screw.

Thus, for example, the dryer reactor 320 of FIG. 3 includes a drying auger 321 having a biomass input 322 to accept the output of load lock 313, a heated biomass output 323 to discharge non-gaseous biomass derived material from the reactor, and a gas output 301 through which gases that evolve from the biomass are captured. Output 323 provides material to an output metering load lock 328 powered by a motor 329. Gas output 301 is connected by line 303 to compressor 370 driven by a motor 371. In one embodiment, compressor 370 is of the type commonly used in automotive applications, which may be, for example and without limitation, a Lysholm supercharger LYS 1200 AX (Lysholm Technologies AB, Saltsjo-Boo, Sweeden). Compressor 370 also has an associated valve 373 that allows gas to be diverted from the compressor to humid air line 113. Thus, for example, the amount of gas provided to compressor 370 may be controlled by opening valve 373, which redirects some or all of the flow in line 303 to line 113.

In one embodiment, drying auger 321 has a hollow drive shaft 324 driven by a motor 327, where a medium temperature heat transfer medium is provided to flow from a high temperature input 325 to a low temperature output 326. The medium temperature heat transfer medium flowing from input 325 to output 326 is thermal contact with biomass within auger 321. In one embodiment, the medium temperature heat transfer medium undergoes a phase change within drying auger 321, resulting in a uniform temperature within the drying auger that may be controlled by the pressure of the medium temperature heat transfer medium.

Input 325 combines the compressed output from line 303 and steam from line 223. Output 326 is separated in to humid air, provided to line 113, and condensate, which is provided to line 211.

In an alternative embodiment, the heat transfer medium flows from an input 325 to an output 326 on the outside of auger 321, providing heating of the biomass through the outer walls of the auger.

In one embodiment, drying auger 321 provides for movement and heating of biomass there through. Auger 321 is preferably sized to transport and provide sufficient heating for the biomass passing there through. Thus drying auger 321 may be, for example and without limitation, of the type manufactured by Augers Unlimited (Coatsville Pa.) fabricated of stainless steel. Thus, for example and without limitation, a throughput of 500 kg/hr may require that auger 321 has a diameter of 24 inches, a length of 32 feet long, and capable operating at of 4 bars pressure.

In one embodiment, load lock 328 provides for metering of material and can allow for a pressure differential across the load lock. Load lock 328 may be generally similar to load lock 313.

In one embodiment, torrefaction reactor 330 provides for movement and heating of biomass there through. Thus torrefaction reactor 330 may be generally similar to drying reactor 320.

The torrefaction reactor 330 of FIG. 3 includes a torrefaction auger 331 having a heated biomass input 332 to accept the output of load lock 328, a torrefied biomass output 333 to provide non-gaseous material from the reactor, and a gas output 305 through which gases that evolve from biomass are collected. Gas output 305 is connected to line 203.

In one embodiment, torrefaction auger 331 has a hollow drive shaft 334 driven by a motor 337, where a high temperature heat transfer medium is provided to flow from a high temperature input 335 that is connected to line 225, to a low temperature heat transfer medium output 336 that is connected to line 213. The heat transfer medium flowing from input 335 to output 336 is thermal contact with biomass within auger 331. In one embodiment, the high temperature heat transfer medium undergoes a phase change within torrefaction auger 331, resulting in a uniform temperature within the torrefaction auger that may be controlled by the pressure of the high temperature heat transfer medium.

In an alternative embodiment, the heat transfer medium flows from an input 325 to an output 326 on the outside of auger 331, providing heating of the biomass through the outer walls of the auger.

In one embodiment, cooling reactor 340 provides for movement and heating of biomass there through. Thus cooling reactor 340 may be generally similar to drying reactor 320 and/or torrefaction reactor 330.

The cooling reactor 340 of FIG. 3 includes a cooling auger 341 having a torrified biomass input 342 to accept the output of output 333, a cooled biomass output 343, and a common gas output 305 with torrefaction reactor 330.

In one embodiment, cooling auger 341 has a hollow drive shaft 344 driven by a motor 347, where a medium temperature heat transfer medium is provided to flow from a low temperature input 346 to a high temperature output 345. The heated medium temperature heat transfer medium then flows into high temperature input 325 of drying reactor 320. In one embodiment, the medium temperature heat transfer medium undergoes a phase change within cooling auger 341, resulting in a uniform temperature within the cooling auger that may be controlled by the pressure of the medium temperature heat transfer medium.

Pelletizer 350 includes a pelletizer screw 352 that accepts material from cooled biomass output 343 and which is driven by a motor 351, a transfer mechanism 354 which driven by a motor 353. Transfer mechanism 354 places the processed solid material in thermal contact with heat exchanger 355, which accepts a low temperature fluid from line 227 and discharges a high temperature fluid into line 215.

In one embodiment, pelletizer screw 352 converts the torrefied biomass into pellets having a maximum size which may be, for example and without limitation, from 1 cm to 10 cm in diameter. In one embodiment, transfer mechanism 354 is a conveyer belt. In one embodiment, heat exchanger 355 is an evaporator coil.

Output hopper 360 includes a material holding bin 361 that includes a heat exchanger 365 that is in series with heat exchanger 355, and has an output 363 that provides processed material, which may be a liquid or a solid, as biofuel to line 111.

Solids processing module 210 may include one or more sensors which may provide sensor output to control system 110. Thus, for example and without limitation, solids processing module 210 is shown as having sensors SHA to sense the humid air within line 113, sensors SD1 to sense the steam exiting drying reactor 320 at output 301, sensors SD2 to sense the gas in the output of compressor 370, sensors SD3 to sense the solids being processed at the exit of the drying reactor, sensors ST1 to sense the solids exiting torrefaction reactor 340. sensors ST2 to sense the torrefaction gases exiting torrefaction reactor 340 and cooling reactor 350, sensors SC1 to sense the solids exiting the cooling reactor, sensors SF1 to sense the solids in holding bin 363, and sensors SF2 to sense the biofuel.

Figure 7:
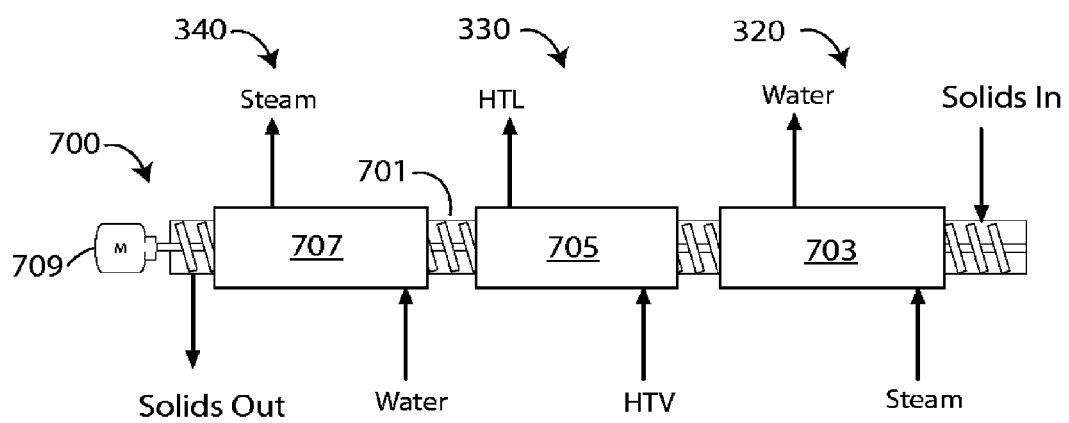
FIG. 7 is an alternative embodiment of the drying, torrefaction, and cooling reactors.

In an alternative embodiment, the heating of one or more of reactors 320, 330, and 340 is accomplished heat transfer to the external casing of the auger 321, 331, or 341, respectively. External heating via heat transfer medium may take place in place of, or in addition to, heating of the auger of the respective reactors, as described here. In another alternative embodiment, two or more of reactors may have a common auger. FIG. 7 is an alternative embodiment of the drying, torrefaction, and cooling reactors, and includes both of these alternative embodiments.

As shown in FIG. 7, a single dryer assembly 700 has a single auger 701 and a motor 709 driving the auger. As the biomass flows though the auger, a first portion of auger 701 forms drying reactor portion 320, a second portion of the auger forms torrefaction reactor portion 330, and a third portion of the auger forms cooling reactor portion 340. Specifically, a medium temperature heat transfer jacket 703 surrounds the drying reactor portion 320 of auger 701, a high temperature heat transfer jacket 705 surrounds the torrefaction reactor portion 330 of the auger, and a medium temperature jacket 707 surrounds the cooling reactor portion 340 of the auger. Connections to the high temperature medium and medium temperature medium loops, gas outflows, and sensors and control mechanisms are generally similar to those of reactors 320, 330, and 340, and are not shown in FIG. 7

In one embodiment, sensors SHA include a temperature, humidity, gas composition, and flow rate of humid air; sensors SD1 include a temperature, and pressure sensor for steam; sensors SD2 sense the temperature and pressure of the compressor output; sensors SD3 sense the temperature of the solids; sensors ST1 sense the temperature of solids; sensors ST2 sense the temperature, pressure, and gas composition of gases; sensors SC1 sense temperature of solids; sensors SF1 sense level of solids within holding bin 363; and sensors SF2 sense the temperature of the biofuel. The measure of temperature, pressure, gas composition, humidity, liquid and solid levels, and flow rates are well known in the field, and may include, but are not limited to, contact and non-contact measurements, optical measurements (i.e. Omega OS100E infrared thermometer to measure temperature or a NIR optical analyzer to determine gas composition), and may include measurements nearby the intended material to be measured, such as measuring a liquid temperature by measuring the wall temperature of a liquid container.

It is understood that the sensors enumerated herein are not meant to be limiting or exclusive, and there may only some of the sensors listed, or there may be other sensors within apparatus 100 that provide output to controller 110.

Figure 4:
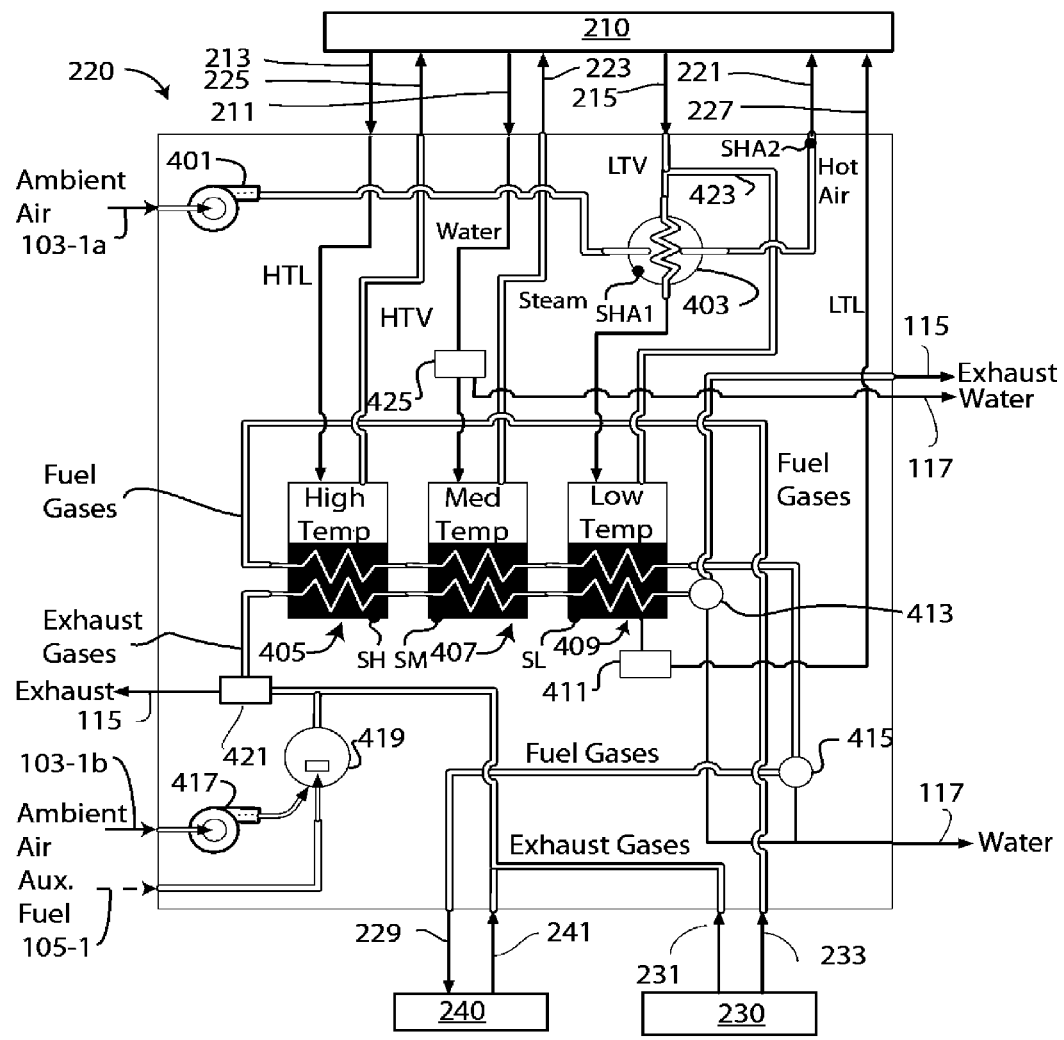
FIG. 4 is a schematic of a heat transfer module of the embodiment of FIG. 2.

FIG. 4 is a schematic of one embodiment of heat transfer module 220, which may be generally similar to the similarly labeled module of FIG. 2, except as further detailed below.

Module 220 includes blowers 401 and 417, boiler/heat exchangers 405, 407, and 409, heat exchanger 403, a pump 411, separators 413 and 415, a burner 419, and a valves 421 and 425.

Blower 401 accepts ambient air from input 103-1a, where it passes through heat exchanger 403 and is provided to line 221 as hot air. Optionally, blower 417 accepts ambient air from input 103-1b, where it is combined with auxiliary fuel from line 105-1 in burner 419.

Boiler 405 is part of a closed, high temperature heat transfer loop that provides heat to torrefy the biomass. Boiler 405 that accepts high temperature heat transfer medium liquid (HTL) from line 213 and provides high temperature heat transfer medium vapor (HTV) to line 225. Apparatus 100 thus has a high temperature heat transfer loop that transfers heat in boiler 405 from the fuel line 233 and exhaust lines 231 and 241 to a high temperature heat transfer medium, which flows via line 225 as a HTV to torrefaction reactor 330, then returning as a HTL via line 213 to boiler 405.

Boiler 407 is part of a medium temperature heat transfer loop that is used for drying the biomass. Boiler 407 is shown, for illustrative purposes, as a water/steam mixture that accepts a low temperature heat transfer medium (such as water) from line 211 and provides high temperature heat transfer medium (such as steam) line 223.

Apparatus 100 thus has a medium temperature heat transfer loop that transfers heat in boiler 407 from the fuel line 233 and exhaust lines 231 and 241 to a medium temperature heat transfer medium, which flows as steam via line 223, joining steam leaving cooling reactor 340 and optionally compressed steam from the biomass before flowing through drying reactor 320. Water leaving drying reactor 320, is provided to cooling reactor 340 and to boiler 407. Since water may be added to the medium temperature heat transfer loop, provisions are provided for excess water to exit by the action of valve 425.

Boiler 409 is part of a closed, low heat transfer loop for recovering energy from the torrefied biomass. Boiler 409 accepts the low temperature heat transfer medium vapor (LTV) from line 215, and provides the output to a pump 411 to provide the low temperature heat transfer medium liquid to line 227. Boiler 409 also has a line 423 that carries vapor away from the boiler and combines it with the vapor of line 215. Line 423 permits excess heat from building up in the system by providing cooling by air in boiler 403. A parallel set of lines run from high-to-low boilers 405, 407, 409, including the combination of line 231 from gas processing module 230, line 241 from power generation module 240 and optional gases from burner 419 in a first line, and line 233 from gas processing module 230 in a second line. In one embodiment, boilers 405, 407, 409 transfer heat from their respective heat transfer medium across tubes containing fuel and exhaust gases, as shown in FIG. 4.

Boilers 405, 407, 409 are generally similar, have decreasing temperatures, and exchange heat between working fluids and combustion and fuel gases, as described subsequently.

Heat to and from the high, medium, and low temperature heat transfer media is removed from fuel gases and exhaust gases from gas processing module 230 and power generation module 240.

Separator 413 separates and provides gases from the exhaust into line 115 and liquid water into line 117. Separator 415 separates and provides gases from the fuel gases into line 229 and liquid water into line 117. In one embodiment, separators 413 and 415 include condensing coils.

Heat transfer module 220 may include one or more sensors which may provide sensor output to control system 110. Thus, for example and without limitation, heat transfer module 220 is shown as having sensors SH to sense conditions in high temperature boiler 405; sensors SM to sense conditions in medium temperature boiler 407; sensors SL to sense the conditions in low temperature boiler 409; sensors SHA1 to sense conditions in heat exchanger 403; and sensors SHA2 to sense the hot air in line 221.

In one embodiment sensors SH sense the temperature, pressure, flow rate, and level of the high temperature heat transfer liquid; sensors SM sense the temperature, pressure, flow rate, and level of the medium temperature heat transfer liquid; sensors SL sense the temperature, pressure, flow rate, and level of the low temperature heat transfer liquid; sensors SHA1 sense the temperature of heat exchanger 403; and sensors SHA2 sense temperature and flow rate of hot air.

Figure 5:
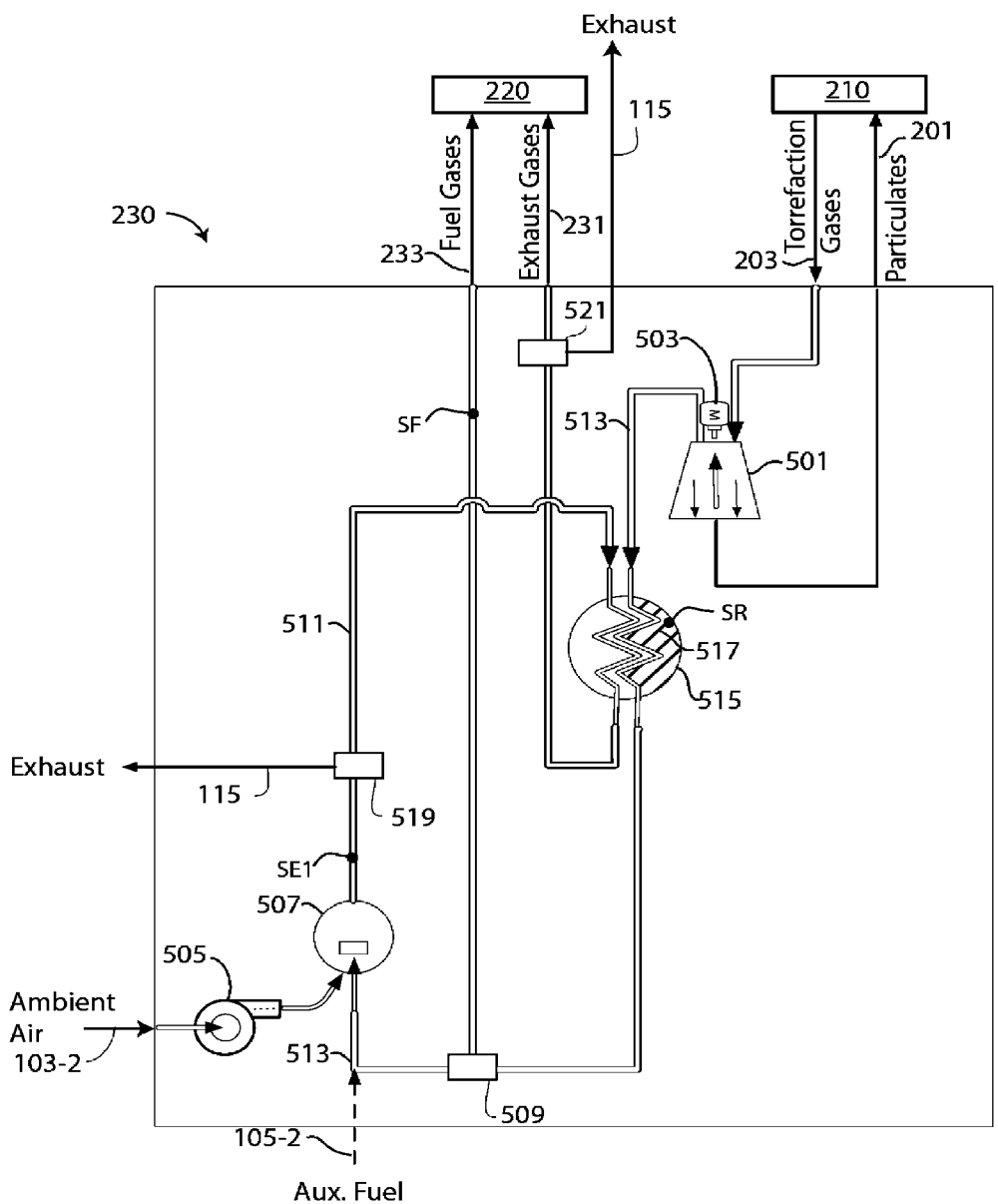
FIG. 5 is a schematic of a gas processing module of the embodiment of FIG. 2.

FIG. 5 is a schematic of one embodiment of gas processing module 230, which may be generally similar to the similarly labeled module of FIG. 2, except as further detailed below.

Module 230 includes a particulate filter 501 powered by a motor 503, a catalyst bed 517 of a reformer 515, a valve 509, an ambient air input at a line 103-2 that is drawn by a blower 505, a burner 507 and valves 519 and 521. Reformer 515 accepts filtered torrefaction gases in line 513 and provides contact with catalyst bed 517, while the heat for the reformer is provided by thermal contact with exhaust from burner 507 in line 511. An auxiliary fuel line 105-2 provides optional fuel to burner 507 to add energy to the system, principally during start-up. Valves 519 and 521 provide a means to remove heat from the system, and are controlled by control system 110.

Gas processing module 230 may include one or more sensors which may provide sensor output to control system 110. Thus, for example and without limitation, gas processing module 230 is shown as having sensors SR to sense conditions in catalyst bed 517; sensors SE1 to sense conditions exiting burner 507; and sensors SF to sense conditions in the fuel gas.

In one embodiment, sensors SR sense the temperature of catalyst bed 517; sensors SE1 sense the temperature, pressure and flow rate of gases exiting burner 507; and sensors SF sense the temperature, pressure, gas composition, and flow rate of fuel gas.

Figure 6:
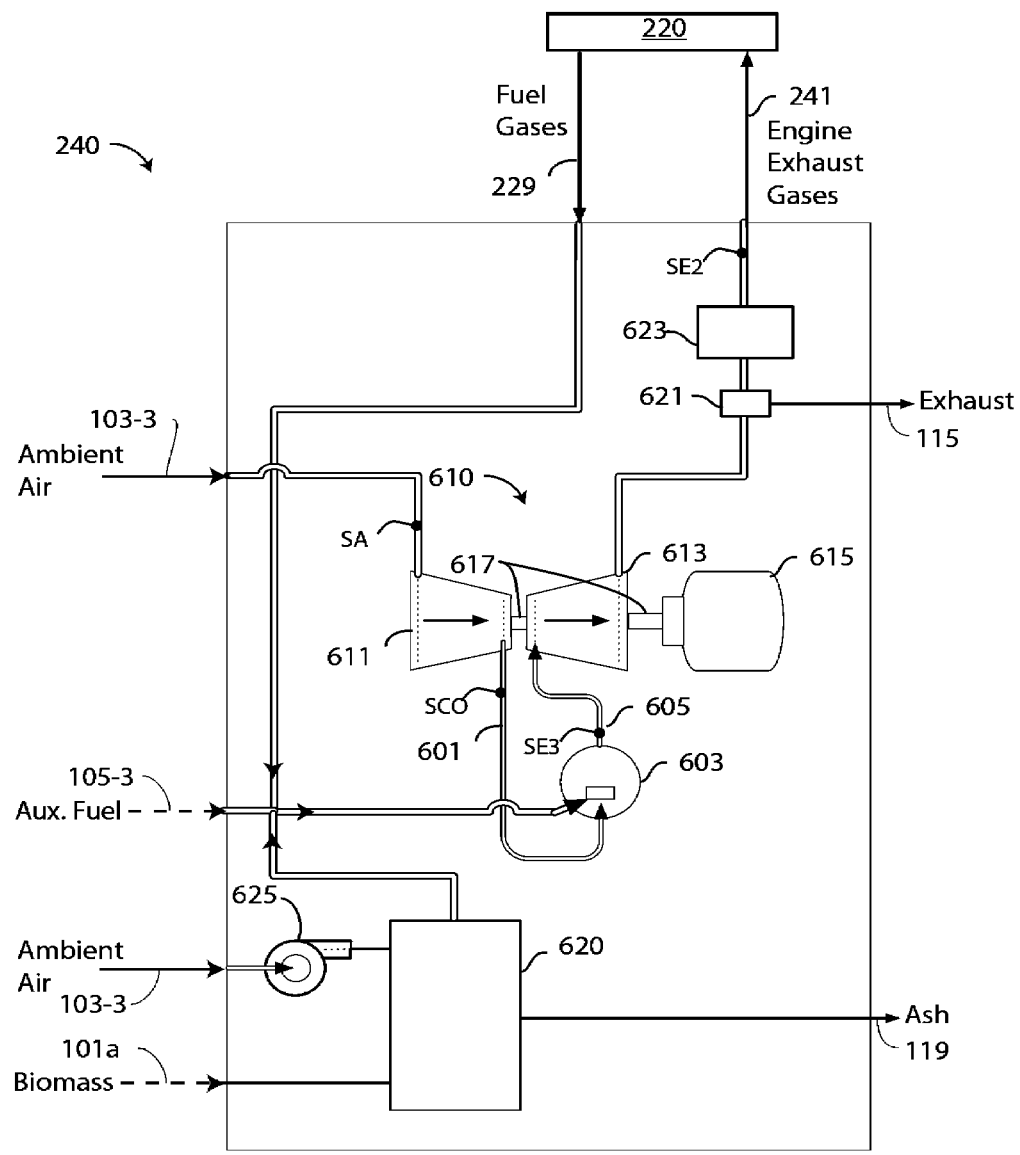
FIG. 6 is a schematic of a power generation module of the embodiment of FIG. 2.

FIG. 6 is a schematic of one embodiment of power generation module 240, which may be generally similar to the similarly labeled module of FIG. 2, except as further detailed below.

Module 240 includes a generator 610 that includes a compressor 611, a turbine 613, and an electric generator 615 all on a common shaft 617. Module 240 also includes a burner 603 which combusts fuel cases, auxiliary fuel, and or gasified biomass for injection into compressor 611, a valve 621 in the exhaust line of turbine 613 to vent some or all of the exhaust to exhaust line 115, and an emissions control subsystem 623 in the exhaust line.

Power generation module 240 accepts ambient air from line 103-3 and compresses the air in compressor 611. The compressed air is combined with fuel gases from line 229 of heat transfer module 220 and an optional auxiliary fuel from line 105-3 in burner 603. The output of burner 605 is provided via a line 605 into turbine 613, and then through line 241 into heat transfer module 220. Electric generator 615 is powered from turbine 613, and generates electricity which may be used to control the power to: motors 315, 327, 337, 347, 351, 353, 371, 503; blowers 401, 417, 505; pump 411; and valves 373, 421, 509, 519, 521, 621 as well as computers, communications, and additional valves and other devices which may not be shown in the Figures, and alternative equipment that is described elsewhere herein.

In an alternative embodiment, power generation module 240 includes a gasification unit 630. Gasification unit 630 directly converts biomass into gaseous fuel for burning in burner. In one embodiment, gasification unit 630 receives a biomass feed via line 101*a* and air via line 103-3 that is provided via a blower 625. Gasification unit 630 produces a waste stream of ash, rejected via line 119 and fuel that is fed into line 229 to burner 603. The biomass received from line 101*a* may be either raw biomass, torrefied biomass, or pelletized torrefied biomass. The gasifier may be, for example and without limitation, of the type described in U.S. Pat. No. 4,764,185, incorporated herein by reference. Gasification unit 630 is operational during startup as an option to using and auxiliary fuel, or as an alternative source of fuel gases when the torrefaction process parameters (for example, temperature and/or time) do not provide sufficient heat to operate gas processing unit 230 at a required temperature.

The exhaust is cleaned up in emissions control subsystem 623 before being provided to heat transfer module 220. The energy balance and temperature in subsystem 623 may be controlled by operating valve 621, which vents the exhaust to line 115.

In one embodiment, compressor 611 and turbine 613 may be a heat engine i.e. a microturbine as manufactured by Capstone (Chatsworth Calif.). In alternative embodiments, generator 610 is an internal combustion engine (i.e. Telefelex GFI) or a fuel cell.

Power generation module 240 may include one or more sensors which may provide sensor output to control system 110. Thus, for example and without limitation, power generation module 240 is shown as having sensors SE2 to sense conditions in line 241; sensors SA to sense conditions of the ambient air; sensors SCO to sense the gases exiting compressor 611; and sensors SE3 to sense conditions of the gases exiting burner 603.

In one embodiment, sensors SE2 senses the temperature, pressure, gas composition, and flow rate of the exhaust gases; sensors SA sense the temperature and flow rate of the ambient air; sensors SCO sense the temperature and pressure of gases exiting compressor 611; and sensors SE3 sense the temperature and pressure of gases exiting burner 603.

Controller 110 include programming that utilizes the output from one or more of sensors SH1, SIM, SD2, SD3, ST1, ST2, SC1, SF1, SF2, SH, SM, SL, SC, SHA1, SHA2, SF, SR, SE1, SE2, SE3, SEC, SA, SE3, and any other sensors in apparatus 100, and control the delivery of power to or the operation of motors 315, 327, 337, 347, 351, 353, 371, 503; blowers 401, 417, 505; pump 411; and valves 373, 421, 425, 509, 519, 521, 621.

Operation of the Apparatus

The following illustrates methods of operating apparatus 200.

The components of solids processing module 210 are sealed from atmosphere, except for hopper 311, which is pressurized by hot air delivered by line 221. Raw biomass is loaded into input hopper 311, as are the particulates that are separated from the torrefaction gases in particulate filter 501 (as discussed subsequent) The rate of biomass and particulates leaving hopper 311 are controlled by a motor 315 which powers input metering load lock 313.

The material then flows through the center of auger 321 of drying reactor 320 according to the power provided to motor 327. In one embodiment the temperature of drying reactor 320 is chosen to drive off volatile liquids, principally water, from the biomass. As such, the temperature of drying reactor 320 is approximately 100 C. The steam, along with some air, thus driven off is collected within auger 321 and exits at gas output 301. The steam and air flow through line 303, where the pressure is increased according the power provided to motor 371, and is combined with steam from line 223 at the high temperature input 325.

Heat is provided to solid processing module 210 through reactors 310 and 330, and recovered through auger 340. Compressor 370 recovers the latent heat of evaporation of the biomass moisture through the addition of work provided by power generation module 240.

In one embodiment, the conditions within shaft 324 are a pressure of approximately 2 bars and a temperature of approximately 170 C at 2 bars. Heat is supplied to the water/steam within shaft 324 in three ways: 1) water is evaporated in boiler 407; 2) biomass moisture, which evaporates in drying reactor 320 is compressed by compressor 370 and mixed with steam from boiler 407; and 3) superheated steam within cooling reactor 340.

Steam is thus piped to hollow drying auger shaft 324 where it condenses at 120 C, releasing the latent heat. The liquid moves by gravity through boiler 407. Compressor 370 maintains a pressure at 2 bars by the addition of mechanical energy. Excess water in the medium temperature heat transfer loop may be sensed by a liquid level sensor SM, and drained from by operating valve 425 to allow the water to exit via line 117.

The operation of the drying reactor, and the associated heat transfer components, is dependent on the moisture content of the raw biomass. For low moisture contents, compressor 370 is under utilized. The solids can thus be processed at a constant rate, independent of moisture content. Similarly, the solids transfer rate can be varied to adjust for moisture content. The solid temperature is measured by sensor SD3, and if this temperature is less than some value, for example and without limitation less than 110 C, the compression will be increased to achieve this temperature, under the control of control module 110. Sensors SD1 and SD2 provide information on the compressor operation.

After heating the biomass in drying reactor 320, the water/steam/air mixture is separated in separator 326 into humid air, which exits at output 113, and water, which exits at line 211. The water is converted to steam in boiler 407, as described subsequently, and returned as steam in line 233.

The dried biomass exiting drying reactor 320 is then metered according to load lock 328 by the power provided to motor 329. Isolating the biomass within drying reactor 320 between load locks 313 and 328 permits the pressure of the biomass to be maintained at a pressure slightly above atmospheric pressure. Thus for example, the pressure of the biomass within drying reactor 320 is from 1 to 10 psi.

Next, the biomass is further heated in torrefaction reactor 330. A "high temperature" heat transfer medium flows between hollow drive shaft 334 and boiler 405 to maintain a temperature high enough to torrefy the biomass. In one embodiment, a temperature of between 200 C and 300 C is maintained. As discussed subsequently, the energy content, density, and other physical quantities of the biofuel are governed, in large part by the conditions in torrefaction reactor 330—that is the temperature and time spent by the biomass in the torrefaction reactor. In general, increasing the temperature of torrefaction reactor 330 and decreasing the speed of drive shaft 334 (that is, increasing the processing time), result in more highly proceeded biomass.

In one embodiment the high temperature heat transfer medium operating between torrefaction reactor 330 and high temperature boiler 405 is Dow Therm A, (Dow Chemical Company, Midland, Mich.), an organic heat transfer fluid that evaporates at 260 C at ambient pressure. Dow Therm gas is piped to the auger 331, where it condenses, releasing latent heat. The liquid returns by gravity to boiler 405, where the liquid temperature is maintained at 260 C. The temperature of boiler 405 is determined by the temperature and volume of the fuel gases in line 233 and exhaust gases in line 231 and 241. These parameters are measured by sensors SH, and controlled by the operation of valve 421, 521 and 519.

Thus, for example and without limitation, embodiments may include a temperature of reactor 330 of approximately 200 C, approximately 225 C, approximately 250 C, approximately 275 C, or approximately 300 C. In another embodiment, embodiments of reactor 330 may, for example and without limitation, have a temperature range comprising a high temperature and a low temperature, where the low temperature is approximately 200 C, approximately 225 C, approximately 250 C, or approximately 275 C, and where the high temperature is approximately 225 C, approximately 250 C, approximately 275 C, or approximately 300 C.

The time that the biomass is in torrefaction reactor 330 may be, for example and without limitation, between approximately 5 minutes and approximately 60 minutes. In one embodiment, the time that the biomass is in torrefaction reactor 330 is controlled by motor 334. The time may be, for example, approximately 5 minutes, approximately 10 minutes, approximately 15 minutes, approximately 20 minutes, approximately 25 minutes, approximately 30 minutes, approximately 35 minutes, approximately 40 minutes, approximately 45 minutes, approximately 50 minutes, approximately 55 minutes, or approximately 60 minutes. In another embodiment, the time is controllable between a minimum time and a maximum time, where the minimum time is any one of the following approximate times: 5, 10, 15, 20, 25, 30, 35, 40, 45, 50, or 55 minutes and the maximum time is any one of the following approximate times: 10, 15, 20, 25, 30, 35, 40, 45, 50, 55, or 60 minutes. In other embodiments, the time may be less than 5 minutes or greater than 60 minutes.

The time that the biomass spends in reactors 320 and 340 may be approximately the same as that spent in reactor 330 or may be longer or shorter depending on the size and throughputs of the reactors, and may be controlled by their respective motors 324 and 344.

Next, the torrefied biomass in cooled in cooling reactor 340, and heat in the biomass is recovered. Cooling reactor 340 is maintained at a temperature of 120 C to 200 C, as provided by heat exchange with water/steam in parallel with drying reactor 320.

The gases evolved from torrefaction reactor 330 and cooling reactor 340 are piped to gas processing module 230 at a pressure slightly above atmospheric, as provided by the sealing action of load lock 328 and pelletizer 352. Cooling auger shaft 344 is filled with liquid water, in parallel with drying auger shaft 324, and recovers sensible heat from the solids by the evaporation of water.

When the heat generated in gas processing module 230 and power generation module 240 are not adequate to maintain the desired temperature, as may occur during the start up of the processes, auxiliary heat is added through burner 507, which combusts an auxiliary fuel (i.e. diesel) with air supplied by blower 505.

Pelletizer 350 provides mechanical power to compress the solid product. The densified pellets are further cooled to 150

C in transfer mechanism 354, and moved to output hopper 360 where they are further cooled to 60 C. Heat is removed through heat exchangers 355 and 365, which are part of the low temperature heat transfer loop that includes boiler 409. In one embodiment, the low temperature heat transfer medium is methanol, and is maintained at a temperature of 60 C in boiler 409.

The sensible heat stored within the pelletized, torrefied biomass is recovered through heat exchangers 355 and 365 which evaporate methanol, stored in boiler 409, and which is used to heat air in heat exchanger 403 for input hopper drying.

Additional heat is available for preheating air from boiler 409 which captures heat from the exhaust and fuel gases.

The low temperature heat transfer "loop" could be alternatively implemented as a circulating fluid or direct air heat transfer, or by pumping a condensed liquid.

Torrefaction reactor 320 expresses gases with low energy value via line 203, which are upgraded in the gas processing module 230 through the operation of a reformer 515 to form a fuel. First, particulate filter 501 cleans the gas, which contacts catalyst bed 517 of reformer 515. The temperature of reformer 515 is preferably held at a temperature of approximately 600 C to 900 C, depending on the catalyst, by the heat provided from the exhaust of burner 507. The air required for combustion of the fuel is supplied through blower 505, and optional auxiliary fuel may be provided from auxiliary fuel line 105-2. In one embodiment, the reforming chemistry is, for example and without limitation, $C_2H_4O_2 \rightarrow 2CO + 2H_2$. The exhaust then exits reformer 515 into line 231, into heat transfer module 220, where it is combined with the exhaust from power generation module 240. Heat from the exhaust gas is recovered in boilers 405, 407, and 409, before being provided to power generation module 240, as described herein.

A gas turbine 613, or alternatively an internal combustion engine, is fueled by the reformed gas in line 229. This shaft power is converted to either hydraulic power or electric power in generator 615. This power is used to operate the motors, compressors, blowers and pumps as needed.

The engine exhaust gases may be one heat source for heat transfer module 220. A 20% efficient engine may cogenerate 65% heat, which is used to partially drive the torrefaction reaction through boiler 405.

In addition to the steady-state operation, as described above, apparatus 100 may also be capable of achieving a steady state operating condition. Since torrefaction gases are not present at start up, some device or means of generating or providing extra fuel is required until a steady mass flow and thermal equilibrium is reached. This may be, for example several hours. A supply of auxiliary fuel, delivered through line 105 or the operation of gasification unit 620 may provide the added energy required for start-up.

Further Operational Considerations and Control Issues

In certain embodiments, apparatus 100 may be used to convert biomass to biofuel over a wide range of conditions. Thus, for example, biomass may have a water content of from approximately 5% to approximately 60%, and have varying amounts of lignin and other compounds. In addition, it may be desirable to produce a biofuel have a well characterized energy content and/or density.

Thus, for example, the biofuel may have a heating value of between 10,000 and 12,000 Btu per pound on an ash free basis, and a density of between 0.8 and 1.4 g/cm$^3$. The heat value, which is greater that that of the biomass, is accomplished by heating the biomass in the absence of oxygen, allowing water and volatile organic compounds resulting from the breakdown the cellulose and hemi-cellulose to be created and driven off. The high density is accomplished through maintaining the temperature below the level where the lignin is chemically altered, and by subsequent compression into pellets.

The fuel value of the torrefied solids can be increased, by increasing the torrefaction temperature and/or exposure time. Thus, different energy value fuels can be produced from this single apparatus, by varying operating conditions. For example, the relative ratios of Hydrogen, Carbon, and Oxygen in the output solids are determined by the operating conditions, such at the temperature and time spent in torrefaction. Similarly, the mass conversion can be adjusted from 70% to 90%, increasing the amount of a lower value fuel, or reducing the amount of a higher value fuel. The ability of the apparatus to operate above, around, or below the auto-thermal condition, based on technical and economic tradeoffs is a consideration which may be subordinated to operation just above the autothermal condition.

In general, the volume and composition of the torrefaction gas is a function of the solid transit time through the torrefaction reactor 330, which is set by motor 337, and the temperature of boiler 405. Bound oxygen is driven off (reduced) from the biomass in torrefaction reactor 330 producing torrefaction gases composed of $CO_2$, $H_2O$ and $C_xH_yO_z$ volatiles. As the temperature of torrefaction reactor 330 increases, or the transit time increases, more of the solids are converted to gases, thus decreasing the mass, and energy content, of the solids and increasing the mass of, and the energy content of the gases. In one embodiment, the carbon conversion ratio of the process may be a control mechanism which allows the apparatus to operate under conditions of varying biomass input characteristics. Thus by adjusting the parameters of the solids processing (that is, the torrefaction auger speed and temperature), the fuel value of the torrefaction gases are likewise adjusted such that the fuel requirements of generator 610 can be met. As the fuel requirements of generator 610 demand rises, so does the heat delivered to the boiler through the cooling of the fuel gases, and through the cooling of the exhaust gases. Thus the boiler naturally increases temperature as the engine load is increased, which in turn increases the expression of combustible torrefaction gases.

In one embodiment, control system 110 dynamically adjusts to differing biomass inputs according to the sensor input and control of valves and motors. In another embodiment and operator may select certain control parameters and/or set points based on historical knowledge gathered by experimentation with various biomass feedstocks.

In yet another embodiment, the reformer 515 is controlled using sensor SR to provide information to controller 110 and valves 519 and 521, which are controlled by the controller. Thus for example, catalysts are known to operate most efficiently at certain temperatures. A temperature measured by sensor SR is compared against a range of set point temperatures. Operating valves 519 and 521, which direct gases to exhaust line 115. This operation of valves allows the reformer to function in a narrow range of temperatures, independent of the volume or energy content of the torrefaction gases. Burner 507 provides the heat to drive the catalytic reforming process of reformer 515, which chemically reduces (removes oxygen) the combustible components of the torrefaction gases. The goal of the reforming is to chemically reduce the condensable gases (present in the torrefaction gases) into non-condensable gases of higher energy value. This is important, as significant water is present in the torrefaction gases, and water is a product of the reforming process. Once the fuel is reformed, a portion is used to provide the heat required for reforming, i.e. 50% of the reformed gases, in burner 507.

Once the torrefaction gas has been upgrade to fuel gas, the water can be removed, using phase separation in the water trap 413, after the fuel gas has been cooled by the boilers, but before it enters the engine. This improves the heating value of the fuel gas by limiting the water content.

Table I illustrates the wide range of conditions of operation of apparatus 100. These results were obtained from a mathematical model of the steady-state operation of an ideal system, and are meant to provide some guidance as to the operation of an actual device. The energy for operating the apparatus was obtained either from the torrefaction gases or by gasifying the biomass directly in power generation module 240.

TABLE I

Torrefaction Temperature Matrix

| Torrefaction Temperature/ C. | Energy Yield in Solids | Mass Yield in Solids | Operating Energy from Torrefaction Gas | Operating Energy from Gassifier | Excess Operating Energy |
| --- | --- | --- | --- | --- | --- |
| 200 | 95% | 90% | 60% | 40% | — |
| 225 | 90% | 85% | 80% | 20% | — |
| 250 | 85% | 80% | 100% | — | — |
| 275 | 80% | 75% | 120% | — | 20% |
| 300 | 75% | 70% | 140% | — | 40% |

Table I illustrates several aspects of the apparatus. First, as the torrefaction temperature is increased, the energy content of the solids decreases. This energy is available in the torrefaction gases, but not in the solid material. Second, as the torrefaction temperature is increased, the mass of solids decrease, again due to water and other volatiles being driven off. Although energy and mass are driven from the biofuel, the energy density increases with torrefaction temperature. In addition, the water resistance of the biofuel also increases with torrefaction temperature.

The first column is the torrefaction temperature (for example, the temperature sensed by sensor SD3, which is indicated, without limitation, at certain temperatures from 200 C to 300 C. The second column is the energy yield in the biofuel exiting apparatus 100. Specifically, the second column is the ratio of the energy content in the exiting biofuel to the energy content in the input biomass, based on the higher heating value. The third column is the mass yield in the biofuel exiting apparatus 100, that is, the biofuel mass flow out divided by the biomass mass flow in, on a dry basis. The remaining columns represent an energy balance in the apparatus. The fourth column is the fraction energy used for operating the entire apparatus that is derived from torrefaction gases, the fifth column is the energy used for operating the entire apparatus that is derived from a gasifier, and the sixth column is the amount of energy consumed in excess of the energy required.

One aspect of certain embodiments is illustrated by the energy balance results on Table I. By having the ability to obtain energy from both torrefaction and gasification, resulting in the dumping of excess heat at higher temperatures, the rate at which this excess heat is removed from the process provides a control mechanism to maintain the system at its desired operating temperature. While it may be possible to operate the process without removing excess heat, the density, energy content, and water resistance of the final product must also be considered, and thus the operating temperature (say, above 250 C) may generate excess heat. In general, the process may be operated over in a narrow band around the desired temperature, and a variable amount of heat escapes the system to allow dynamic control.

One variation in the operation of apparatus 100 results from variations in the water content of the biomass. The following are some example of how apparatus 100 may be controlled to respond to variations in biomass moisture content.

In one embodiment, compressor 370 is operated when the biomass moisture content is sufficiently high. Thus, for example and without limitation. Compressor 370 may be operated when the biomass moisture content is greater than 25%.

As an example, compressor 370 may be controlled by properties of the biomass as it enters load lock 328 using a sensor SD3 which provide a reading to controller 110. In one embodiment, sensor SD3 measures a temperature of the biomass or of machinery in thermal contact with the biomass, which may be used as follows to control compressor 370. The temperature measured by temperature sensor SD3 is an indirect measure of the moisture content. When the temperature measured by temperature sensor SD3 is greater than some set point, which may be for example a temperature between 90 and 120 C, compressor is 370 is turned off by controller 110. When the temperature measured by temperature sensor SD3 is below the set point, compressor 360 may be is turned on. The control of compressor 370 by the reading of sensor SD3 may be determined by an algorithm which uses the time history of the measured temperature, and drives this temperature to the set point. This algorithm may be a PID control, or other control methods known in the art. When compressor 370 is off, any water vapor is vented as humid air 113, through vent valve 373 in line 303.

In another embodiment, when the biomass is dry, there is a possibility of there being too much energy in the torrefaction gases, and some of the extra heat must be vented from apparatus 100 to prevent over heating of the gases, and some of the heat is vented by allowing the exhaust to be diverted through valves 421, 519 and 521. Thus, for example, sensors SH, SM, and SL may be temperature sensors to measure the temperature in boilers 405, 407, and 409, respectively. The outputs of sensors SH, SM, and SL may be used to control the operation of valves 421, 519 and 521. By controlling valves 421, 519 and 521, and thus the percentage of diverted exhaust gases around the heat exchangers coupled to boilers 405, 407 and 409, the boiler temperatures may be effectively controlled. The temperature of heat transfer fluids in boilers 405, 407 and 409, in turn, establish the volume and composition of the torrefaction gas.

For very dry input conditions, it is possible that up to 20% of the heat value of the torrefaction gas may be vented to exhaust lines 115. With continued operation, the system may equilibrate so that the quantity of torrefaction gas produced is reduced and less heat is dumped, which increases the carbon conversion ratio.

In other embodiments, when the temperature measured by sensor SD3 is less than some set point, such as 105 C, the biomass may be considered to not be adequately dried. Controller 110 may then activate compressor 370. This, in turn will require that power generation module 240 utilize more fuel, auxiliary fuel, or gasified fuel to produce the required power. When compressor 370 is operated at full load, apparatus 100 power increases requiring, for example, from 2-20% more fuel. Controller 110 then determines the required fuel volume, changing the flow of fuel gas is diverted to burner 507. The valves 421, 519 and 521 may then be closed, increasing the temperature of boilers 405, 407 and 409. This in turn increases the volume of and energy content in the torrefaction gas. Equilibrium is reached when the high temperature boiler temperature rises to a second set point, a programmable level between 250 and 350 degrees C.

The engine control mechanism determines the flow through tee 509, based on having the generator 610 utilizing all the needed fuel for operation based on exhaust oxygen sensors. All of the remaining fuel gas is burned in 507.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. An apparatus for processing a biomass, said apparatus comprising:
   a reactor including a first portion for transporting and thermally treating biomass and a second portion for transporting a heat transfer medium, where at least part of the second portion is in thermal contact with at least part of the second portion, and where
   said first portion includes an inlet to accept the biomass, a first outlet to provide treated biomass, and a second outlet to provide gases evolved from the biomass at said second outlet, and
   said second portion includes an inlet to accept a heat transfer medium and an outlet to provide the heat transfer medium;
   a reformer having an inlet in fluid communication with the second outlet of said first portion, and an outlet, where the reformer is adapted to chemically react gas accepted at said inlet and provide a fuel at said outlet; and
   a heat exchanger adapted to provide thermal contact between the heat transfer medium and the fuel, where said heat exchanger has an inlet in fluid communication with said second portion outlet, an outlet in fluid communication with said second portion inlet, a fuel inlet in fluid communication with the reformer outlet, and a fuel outlet to provide fuel,
   where, when said apparatus is provided with biomass, said reactor thermally treats said biomass to form processed biomass and said heat exchanger recovers thermal energy for the reactor.

2. The apparatus of claim 1, where said first portion includes an auger.

3. The apparatus of claim 1, where said reactor includes a first reactor, a second reactor and a third reactor, where each of said first reactor, second reactor, and said third reactor has a corresponding first portion and second portion,
   where said first reactor accepts biomass and operates at a nominal first reactor temperature sufficient to dry any biomass contained therein,
   where said second reactor accepts the output of said first reactor and operates at a temperature sufficient to torrefy any biomass contained herein, and
   where said third reactor accepts the output of the second reactor and operates at a temperature less than the temperature of said second reactor.

4. The apparatus of claim 3, where said first reactor and said third reactor have a common first heat transfer medium, and where said second reactor has a second heat transfer medium.

5. The apparatus of claim 4, further including a boiler to recover thermal energy from said biofuel and said reformer, and provide the recovered thermal energy to said first heat transfer medium.

6. The apparatus of claim 5, further comprising a heat engine coupled to a generator, where said fuel is provided to said heat engine, where said generator generates electric energy to operate the apparatus, and where the exhaust of said heat engine is provided to said boiler to transfer thermal energy to said first heat transfer medium.

7. The apparatus of claim 6, where said heat engine is one or more of an internal combustion engine or a turbine.

8. The apparatus of claim 7, further comprising a gasifier having an inlet to accept biomass and an outlet to provide gasified biomass to said heat engine.

9. The apparatus of claim 8, where the recovered thermal energy and the converted electrical or mechanical energy is sufficient to operate the apparatus without additional energy input.

10. The apparatus of claim 4, where said first heat transfer medium is water, where said second outlet of said first reactor provides steam from the biomass, said apparatus further comprising a compressor in fluid communication with said first reactor first portion second outlet and said first reactor second portion inlet, such that said compressor compresses steam from the biomass and utilizes the steam to dry the biomass.

11. The apparatus of claim 10, further including one or more sensors to measure the temperature and pressure of the steam and temperature of the biomass exiting the first reactor, and a control system to accept the measurements and adjust the operation of the compressor to provide fully dried biomass to said second reactor.

12. The apparatus of claim 4, further including one or more sensors to measure the temperature, pressure and composition of the biomass within the second reactor, and a control system to accept the measurements and adjust the solid feed rate and/or the temperature of the biomass within said second reactor to dynamically adjust the volume and composition of the gases evolved from the torrefied biomass.

13. The apparatus of claim 3, where said second reactor operates at a temperature of from 200° C. to 300° C.

14. The apparatus of claim 1, where said heat transfer medium undergoes a phase change within said second portion.

15. The apparatus of claim 1, further including a device to form pellets from said biofuel.

16. The apparatus of claim 1, further including one or more sensors to measure the apparatus, and a control system to accept the measurements and adjust the time and/or temperature that the biomass is within said reactor.

17. The apparatus of claim 1, further including a burner adapted to accept a portion of the fuel, and where heat generated in the burner is provided to the reformer.

* * * * *